United States Patent [19]

Steffan et al.

[11] Patent Number: 4,499,920

[45] Date of Patent: Feb. 19, 1985

[54] APPARATUS FOR CONTROLLING A VALVE

[75] Inventors: Leonard D. Steffan, Perrysburg, Ohio; Robert D. Kohler, Temperance, Mich.

[73] Assignee: Owens-Illinois, Inc., Toledo, Ohio

[21] Appl. No.: 378,563

[22] Filed: May 17, 1982

[51] Int. Cl.³ .............................................. F15B 9/09
[52] U.S. Cl. ................... 137/624.15; 138/45; 318/603; 318/685; 65/163; 65/DIG. 13; 251/133
[58] Field of Search ............... 251/133; 318/685, 603, 318/596; 138/45; 65/163, DIG. 13; 91/35, 405, 91/454; 137/624.15

[56] References Cited

U.S. PATENT DOCUMENTS

| | | | |
|---|---|---|---|
| 3,488,030 | 1/1970 | Hulme et al. | 251/134 |
| 3,727,520 | 4/1973 | McKown et al. | 318/685 X |
| 3,982,726 | 9/1976 | Bublitz et al. | 251/133 |
| 4,007,028 | 2/1977 | Bublitz et al. | 65/163 |
| 4,140,956 | 2/1979 | Pritchard | 318/685 X |
| 4,356,439 | 10/1982 | Mott et al. | 318/603 X |
| 4,367,087 | 1/1983 | Franco et al. | 65/163 |

OTHER PUBLICATIONS

G. P. Check, R. F. Dimmick, K. L. Thompson; "Programmable Stepper Motor Control" *IBM Technical Disclosure Bulletin*; vol. 17, No. 11, (Apr. 1975).
J. D. Usry, "Stepping Motors for Valve Actuation", *Instrumentation Technology*, vol. 24, No. 3, (Mar. 1977).
R. Weston, B. Hamilton, "Microprocessor Control of the IS Machine Invert Mechanism", *Glass Technology*, vol. 22, No. 3, (Jun. 1981).

Primary Examiner—Gerald A. Michalsky
Assistant Examiner—John C. Fox
Attorney, Agent, or Firm—Gerald T. Welch; Myron E. Click

[57] ABSTRACT

Apparatus for controlling the aperture size of a valve in a fluid exhaust line from an individual section of glass forming machine is disclosed. The apparatus controls the aperture size of the valve in response to first and second control signals and comprises a driver connected to the valve for decreasing the aperture of the valve from a preset size to a restricted size by a series of discrete steps and then for increasing the aperture of the valve from the restricted size back to the preset size by a series of discrete steps. The driver is responsive to a directional signal and a series of electrical pulses each actuating a corresponding discrete step to decrease the size of the aperture when the directional signal is applied thereto and to increase the size of the aperture when the directional signal is removed therefrom. The apparatus also comprises a control having a first input responsive to the first control signal which when applied causes the control to provide a directional signal and a predetermined number of electrical pulses to the driver for actuating a predetermined number of discrete steps required to decrease the aperture of the valve from the preset size to the restricted size and a second input responsive to the second control signal which when applied causes the control to remove the directional signal from the driver and provide the predetermined number of electrical pulses to the driver to increase the aperture of the valve back to its preset size.

1 Claim, 3 Drawing Figures

| | $\overline{Q}57$ | $\overline{Q}37$ | 40 | STATE |
|---|---|---|---|---|
| (0) | 1 | 1 | 0 | C/K INHIBITED |
| (1) | 1 | 0 | 1 | EXT-T MODE |
| (2) | 1 | 1 | 0 | C/K INHIBITED |
| (3) | 0 | 1 | 1 | RTR-T MODE |

APPARATUS FOR CONTROLLING A VALVE

FIELD OF THE INVENTION

This invention relates to controlling a valve in a fluid exhaust line from an individual section of a glass forming machine, and more particularly to a method and apparatus therefor.

BACKGROUND OF THE INVENTION

A glass forming machine comprises individual sections each having a plurality of mechanisms for performing various glass forming functions. Several of the mechanisms are actuated by air cylinders which cause the mechanism to move rapidly from one position to another. Although it is desirable to operate the mechanisms at production speeds, the fragility of the glassware itself presents a limitation on the maximum speed obtainable. In order that such air cylinders can accomplish a glass forming function at production speeds without destroying the glassware, the piston of the cylinder is cushioned at the end of its stroke against the base of the cylinder. Since the air between the piston and the base of the cylinder is compressed as the piston strokes toward the base, cushioning is conveniently accomplished by controlling the rate at which the air is exhausted therefrom.

In the past, cushioning was accomplished by using a side port through the wall of the cylinder in conjunction with a port in the base of the cylinder. Before reaching the side port, the piston moves in operation at a production speed because the air in the cylinder is being exhausted at a high rate through both the side port and the base port. When the piston approaches the end of its stroke and closes off the side port, it slows down since the air is being exhausted at a lower rate through the base port only. Further cushioning was accomplished by using a variable aperture needle valve in conjunction with the base port as disclosed in U.S. Pat. No. 4,007,028 granted Feb. 8, 1977 to A. T. Bublitz, et al. The patent discloses apparatus comprising a needle valve having a worm wheel connected to the free end of the valve stem and opposing worm gears driven by a remote motor for alternately engaging the worm wheel to open or close the valve. Additional cushioning was accomplished by using a cushion plug affixed to the piston and a cushion socket formed in the base of the cylinder for receiving the cushion plug. When the piston approaches the end of its stroke, the plug is forced into the socket which compresses the air therein to further reduce the speed of the piston before impact against the base.

SUMMARY OF THE INVENTION

The instant invention is based on the discovery of a method and apparatus for controlling a valve in a fluid exhaust line from an individual glass section of a glass forming machine in response to a first and second control signal. The apparatus comprises a screw shaft having one end connected directly to the valve and a stepper motor having an internally threaded rotor threadably engaging the screw shaft to move the shaft axially in both directions for increasing and decreasing the aperture of the valve. The apparatus further comprises a driver electrically connected to the motor for stepping the rotor of the motor in both directions. The driver has a toggle input responsive to a series of pulses and a direction input responsive to a binary signal. The apparatus finally comprises a control electrically connected to the driver for applying a predetermined number of pulses to the toggle input of the driver and a binary signal to the direction input of the driver. The control has a first input responsive to the first control signal which causes the control to apply a predetermined number of pulses to the toggle input of the driver and a high signal to the direction input of the driver that causes the rotor of the motor to step in one direction. The control also has a second input responsive to the second control signal which causes the control to apply the predetermined number of pulses to the toggle input of the driver and a low signal to the direction input of the driver that causes the rotor of the motor to step in the other direction.

It is an object of the instant invention to control the exhaust rate of air from the cylinder by incrementally decreasing the aperture size of the needle valve in a predetermined number of steps to gradually cushion the piston upon impact against the base of the cylinder, and then by incrementally increasing the aperture back to its original size in readiness for another cushioning cycle. The invention eliminates the need for a side port since the size of the aperture can be set originally to obtain the same exhaust rate as obtained by using the side port in conjunction with the base port. Thus, the aperture of the needle valve can be set so that the piston moves at production speed, and then decreased so that the piston is cushioned against the base of the cylinder at the end of its stroke. The instant invention also eliminates the need for the additional cushioning provided by a plug and socket since the control can decrease the aperture of the valve at different rates to achieve the desired cushioning effect. Furthermore, the instant invention eliminates complicated mechanical links such as remotely driven worm gears alternately engaging a worm wheel.

DETAILED DESCRIPTION OF THE INVENTION

Figure 1:
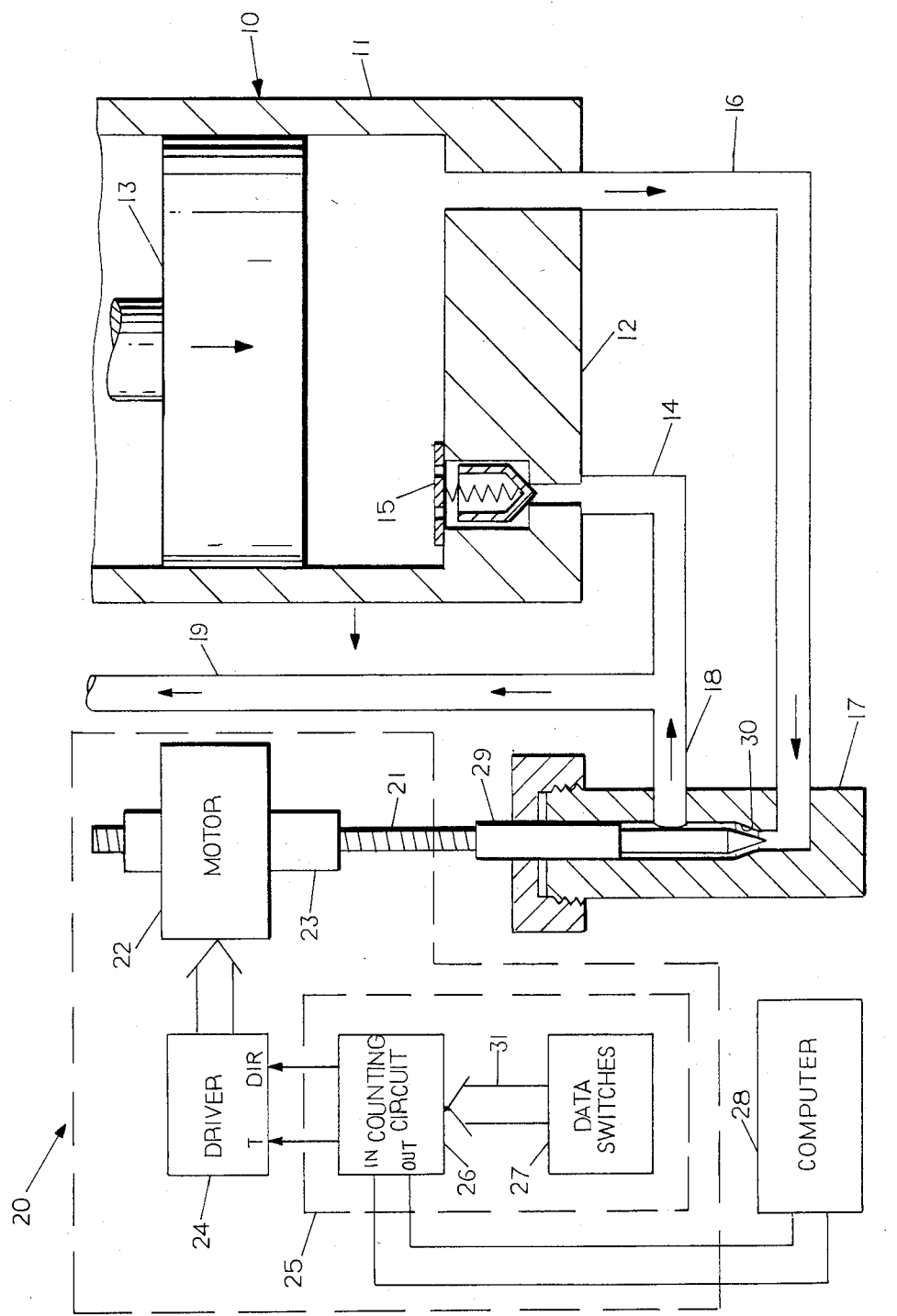
FIG. 1 is a partially schematic, vertically sectional view of an air cylinder, a needle valve, and a block diagram of apparatus for controlling the valve in accordance with the invention.

A typical glass forming machine comprises several individual sections (IS) each having a plurality of mechanisms for performing various glass forming functions. Several of the mechanisms are actuated by air cylinders, such as that indicated generally at 10 in FIG. 1, which cause the mechanism to move rapidly from one position to another. The air cylinder 10 comprises a tubular wall 11 closed at one end by a base 12 and a piston 13 housed within the tubular wall 11. Air between the base 12 and the piston 13 is supplied by a line 14 through a check valve 15 in the base 12, and exhausted by a line 16 from the base 12 through a needle valve 17. The exhaust output 18 of the needle valve 17 and supply line 14 are connected to a primary line 19 having a fixed valve (not shown) for controlling the rate of air exhausted when flowing in a direction indicated by the arrows. During this exhaust mode, air flow through the supply line 14 is interrupted because the check valve is closed by the air pressure which builds up between the base 12 and the piston 13. Although it is desirable to operate the mechanisms at production speeds, the fragility of the glassware itself presents a limitation on the maximum speed obtainable. In order that the air cylinder 10 can accomplish a glass forming function at production speeds without destroying the glassware, the piston 13 of the cylinder 10 is cushioned at the end of its stroke against the base 12 of the cylinder 10. Since the air between the piston 13 and the base 12 of the cylinder 10 is compressed as the piston 13 strokes toward the base 12, cushioning is conveniently accomplished by controlling the rate at which the air is exhausted out the primary line 19.

In the past cushioning was accomplished by using a side port connected to the primary line 19 through the wall 11 of the cylinder 10 in conjunction with the exhaust line 16 from the base 12 of the cylinder 10. Before the piston 13 reached the side port, it moved at production speed because the air in the cylinder 10, was being exhausted at a high rate through both the side port and the exhaust line 16. When the piston 13 approached the end of its stroke and closed off the side port, it slowed down since the air was being exhausted at a lower rate through the exhaust line 16 only. Additional cushioning was accomplished by using a cushion plug affixed to the piston 13 and a cushion socket formed in the base 12 of the cylinder 10 for receiving the cushion plug. When the piston 13 approached the end of its stroke, the plug was forced into the socket which compressed the air therein to further reduce the speed of the piston 13 before impact against the base 12.

The instant invention controls the exhaust rate of air from the cylinder 10 by incrementally closing the needle valve 17 in a predetermined number of steps to gradually cushion the piston 13 upon impact against the base 12 of the cylinder 10 and then by incrementally opening it back to original position in readiness for another cushioning cycle. The invention eliminates the need for a side port since the valve 17 can be opened to obtain the same exhaust rate as obtained by using the side port in conjunction with the exhaust line 16. Thus, the needle valve 17 can be set so that the piston 13 moves at production speed, and then closed so that the piston is cushioned against the base 12 of the cylinder 10 at the end of its stroke. The instant invention also eliminates the need for the additional cushioning provided by the plug and the socket since the valve 17 can be closed at different rates to achieve the desired cushioning effect.

Apparatus for controlling a valve in a fluid exhaust line from an individual section of a glass forming machine is indicated generally at 20. The apparatus 20 comprises a screw shaft 21, a motor 22 having an internally threaded rotor 23 threadably engaging the screw shaft 21 to move the screw shaft 21 axially in both directions, and a driver 24 electrically connected to the motor 22 for stepping the rotor 23 of the motor 22 both clockwise and counterclockwise. The stepper motor 22 the shaft 21 and the driver 24 can be purchased as a single unit known as a linear actuator from the North American Philips Controls Corp., located at Cheshire, Conn. The driver 24 for stepping the rotor 23 of the motor 22 has a toggle input T responsive to a series of digital impulses and a direction input DIR responsive to a binary signal. The apparatus further comprises a control 25 including a counting circuit 26 and a set of BCD data switches 27 electrically connected thereto. The counting circuit 26 of the control 25 is electrically connected to the driver 24 and when operative applies a predetermined number of pulses, as set by the data switches 27, to the toggle input T of the driver 24 and a binary signal to the direction input DIR of the driver 24. The counting circuit 26 has a first input IN responsive to a first control signal which causes the control 25 to enter an extend-toggling (EXT-T) mode in which the counting circuit 26 applies a predetermined number of pulses to the toggle input T of the driver 24 and a high signal to the direction input DIR of the driver 24 and a second input OUT responsive to a second control signal which causes the control 25 to enter a retract-toggling (RTR-T) mode in which the counting circuit 26 applies a predetermined number of pulses to the toggle input T of the driver 24 and a low signal to the direction input DIR of the driver 24.

In operation, the first and second control signals are provided by a computer 28 associated with the operation of the IS machine. The computer 28 is programmed to apply the first control signal to the IN terminal of the counting circuit 26 when the exhaust rate must be reduced to cushion the piston 13 against the base 12 at the end of its stroke. When the computer 28 provides a pulse to the IN terminal of the counting circuit 26, the control 25 enters the EXT-T mode which causes the rotor 23 of the motor 22 to step in one direction to axially extend the screw shaft 21. The screw shaft 21 is connected to the stem 29 of the valve 17 and extends the tapered end of the stem 29 into the orifice 30 of the valve 17 to reduce the size of its aperture. As a result, the exhaust rate decreases to slow down and cushion the piston 13 against the base 12. The piston 13 is slowed down to a specific rate to produce a desired cushion by controlling the number of pulses that the counting circuit 26 applies to the toggle input T of the driver 24. This is accomplished by setting the data switches 27 to enter a predetermined number to the counting circuit 26 via a data bus 31. The piston 12 can also be slowed at different rates by controlling the stepping frequency of the pulse train being applied by the clock 38 to the toggle input T of the driver 24. The computer 28 is also programmed to apply the second control signal to the OUT terminal of the counting circuit 26 to return the valve stem 29 to its original position. When the computer 28 provides a pulse to the OUT terminal of the counting circuit 26, the control 25 enters the RTR-T mode which causes the rotor 23 of the motor 22 to step in the other direction to axially retract the screw shaft 21. The screw 21 retracts the tapered end of the valve stem 29 out from the orifice 30 of the valve 17 to its original position. As a result, the exhaust rate will be the same for the next exhaust/cushioning cycle. The counting circuit 26 also includes a feature which insures that the valve stem 29 will be restricted to its original position even when the second control signal is applied to the OUT terminal thereof before stem 29 is fully extended. To describe this feature, the details of construction of the control 25 must first be described.

Figure 2:
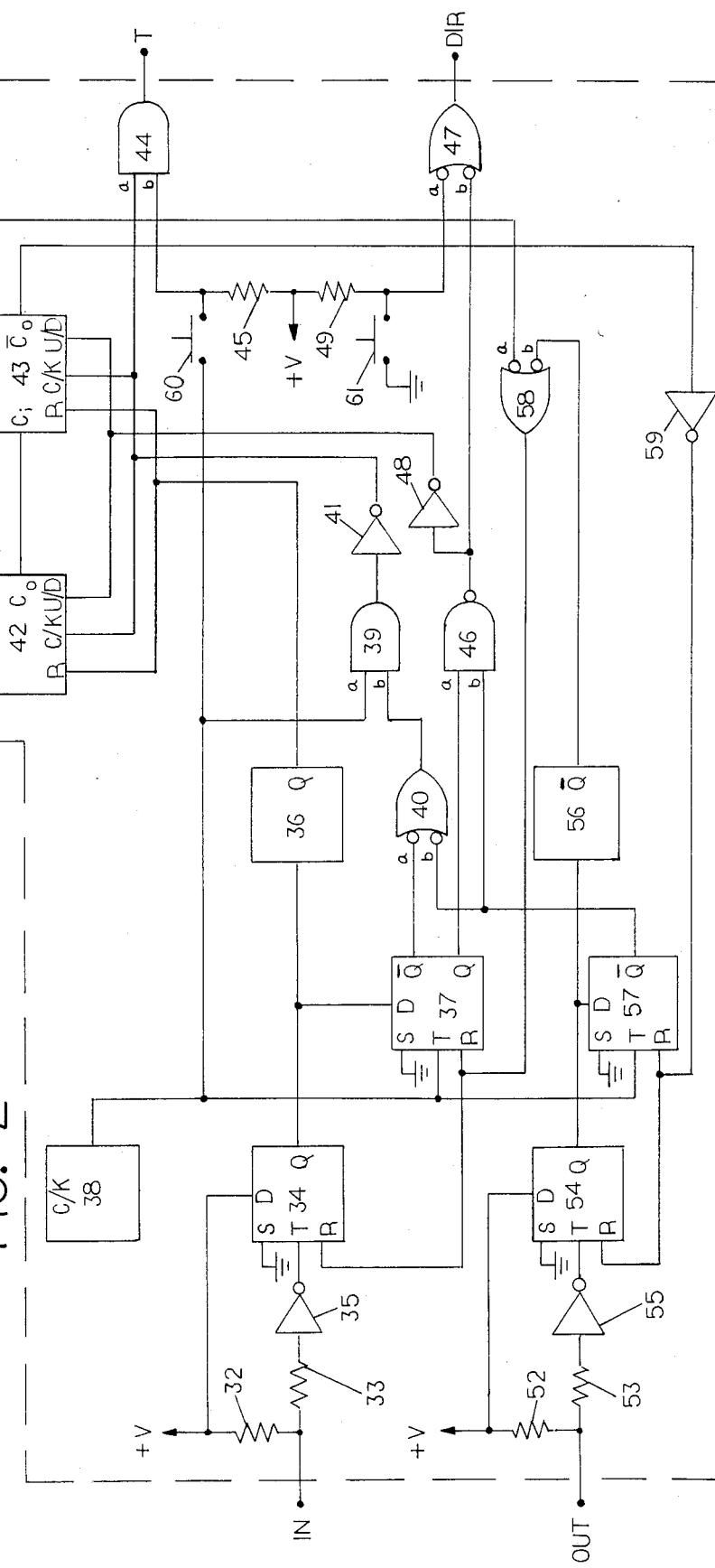
FIG. 2 is an electrical schematic of a control of the apparatus shown in FIG. 1 in accordance with the invention.

Referring in more detail to FIG. 2, the control 25 comprises the counting circuit 26 and the data switches 27. The IN terminal of the counting circuit 26 is connected to the junction of resistors 32 and 33. The other end of the resistor 32 is connected to a positive voltage V as is the data terminal of a RS flip flop 34. The other end of the resistor 33 is connected through an inverter 35 to the toggle input of the flip flop 34 having a grounded set terminal. The output of the flip flop 34 is applied to the input of a one-shot monostable multivibrator 36 and the data terminal of a RS flip flop 37 having a grounded set terminal. A clock 38 applies a train of pulses to the toggle input of the flip flop 37 and an input 39a of an AND gate 39. The complementary output of the flip flop 37 is connected to an input 40a of a negated OR gate 40, the output from which is connected to an input 39b of the AND gate 39 to enable pulses from the clock 38 to pass through the AND gate 39. The output from the AND gate 39 is connected through an inverter 41 to the clock terminals of counters 42 and 43 and to an input of an AND gate 44. Another input 44b of the AND gate 44 is held high through a resistor 45 to enable positive pulses to pass therethrough to the toggling input T of the driver 24 (not shown). The output of the flip flop 37 is connected to an input 46a of a NAND gate 46, the output from which is connected to an input 47b of a negated OR gate 47 and through an inverter 48 to the up/down control terminals of the counters 42 and 43 causing the counters to count up. Another input 47a of the negated OR gate 47 is held high through a resistor 49. This enables the proper binary signal (high) to be applied to the direction input DIR of the driver. The one-shot multivibrator 36 provides an output having a pulse width adjusted to less than that of an individual clock pulse to reset the counters 42 and 43. The carry-out terminal of the counter 42 is connected to the carry-in input of the counter 43. The data outputs $B_0$ through $B_3$ of each of the counters 42 and 43 are connected to corresponding inputs of comparators 50 and 51, respectively. A second series of inputs to comparators 50 and 51 is obtained from the data switches 27 through the data bus 31 which is connected to the input terminals $A_0$ through $A_3$ of each of the comparators 50 and 51. The (A<B) output and the (A=B) output of the comparator 50 are connected to the corresponding inputs of the comparator 51. As illustrated, the counters 42 and 43 and the comparators 50 and 51 are cascaded to count and compare up to 159 pulses. It is to be understood, however, that additional counters and comparators can be cascaded so that a greater number of pulses can be counted and preset by the data switches 27. The OUT terminal of the counting circuit 26 is connected to the junction of resistors 52 and 53. The other end of the resistor 52 is connected to a positive voltage V as is and the data terminal of a RS flip flop 54. The other end of the resistor 53 is connected through an inverter 55 to the toggle input of the flip flop 54 having a grounded set terminal. The output of the flip flop 54 is connected to the input of a one-shot monostable multivibrator 56 and the data terminal of a RS flip flop 57 having grounded set terminal. The output of the clock 38 is also applied to the toggle input of the flip flop 57. The complementary output of the flip flop 57 is connected to an input 40b of the negated NOR gate 40 and an input 46b of the NAND gate 46.

Figure 3:
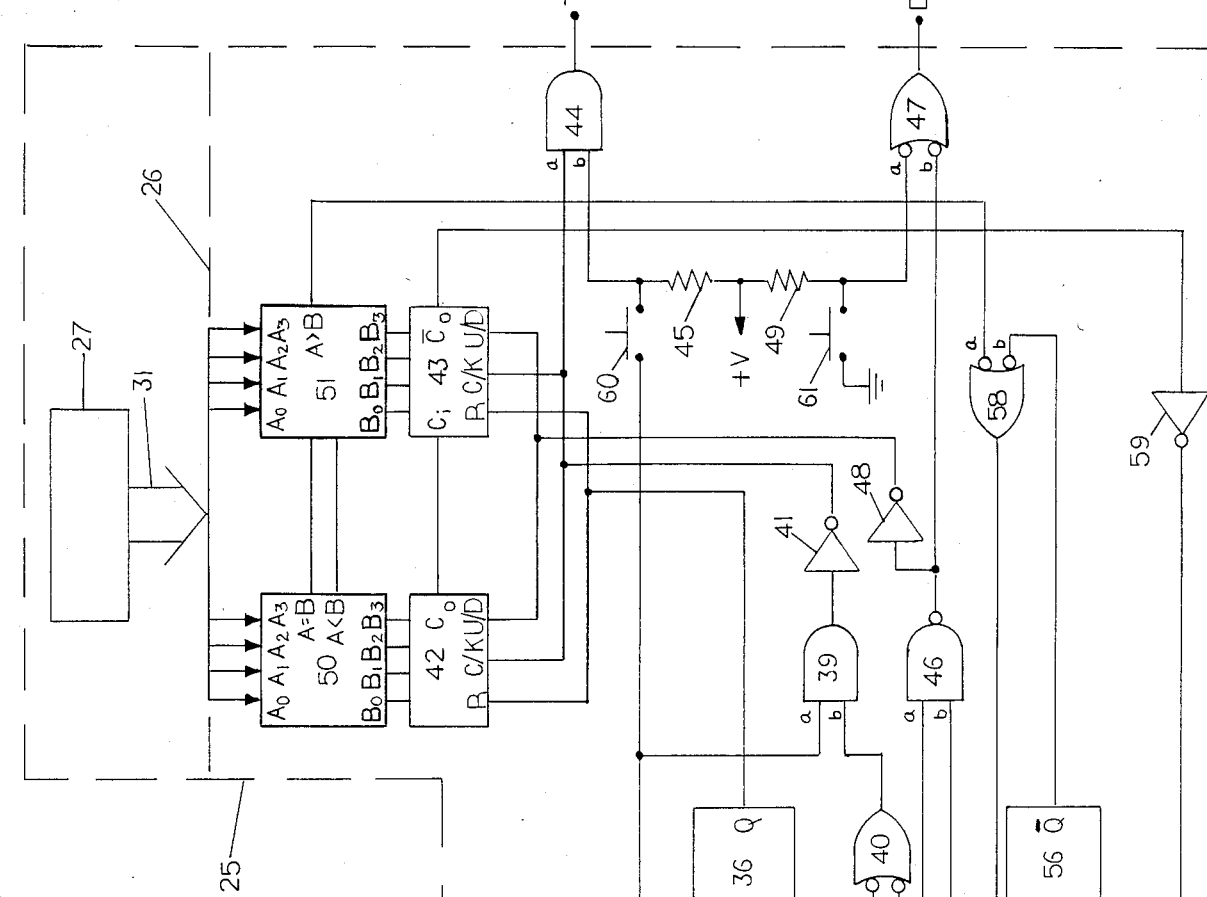
FIG. 3 is a truth table for a logic element in the control apparatus shown in FIG. 2 in accordance with the invention.

Referring to FIGS. 2 and 3, the control 25 enters the EXT-T mode when the first control signal is applied as a low signal to the IN terminal of the counting circuit 26. The low signal sets the flip flop 34 because the positive-going edge of a pulse is applied to the toggle input while a high signal is applied to the data input thereof. As a result, the output of the flip flop 34 goes high and is applied to the input of the multivibrator 36 and the data terminal of the flip flop 37. The flip flop 37 becomes set when the positive-going edge of a pulse from the clock 38 is applied to the toggle input thereof. Thus, the output of the flip flop 37 is synchronized to change with the positive-going edge of the clock 38. Although pulses are also being applied to the toggle input of the flip flop 57, it has not yet been set because its data terminal is held low by the output of the flip flop 54. Thus, the flip flop 57 provides a high signal from its complementary output to the input 40b of the negated OR gate 40. When the flip flop 37 is set, its complimentary output goes low and is applied to the input 40a of the negated OR gate 40 which applies a high signal (see FIG. 3, State 1) to the input 39b of the AND gate 39 to enable pulses from the clock 38 to the inverter 41. The inverter 41 effectively delays the pulses by one half of the clock period before the counters 42 and 43 begin to count the pulses (and before the driver 24 responds to the same pulses) that are being successively applied through the AND gate 44 to the toggling input T of the driver 24 (not shown). During this duty cycle, the multivibrator 36 has an opportunity to reset the counters 42 and 43 before being incremented. The complementary output of the flip flop 57 also provides a high signal to the input 46b of the NAND gate 46. When the flip flop 37 becomes set, its output also provides a high signal to the input 46a of the NAND gate 46 which then applies a low signal to the input 47b of the negated OR gate 47, the output of which applies a high signal to the direction input DIR of the driver 24 (not shown). Each pulse from the clock 58 is simultaneously being accounted for by the counters 42 and 43 which are being incremented because the inverter 48, connected to the output of the NAND gate 46, applies a high signal to the up/down controls of the counters 42 and 43. Therefore, when the controller 25 (FIG. 1) is in the EXT-T mode, the counting circuit 26 applies pulses to the toggle input T and a high signal to the direction input DIR of the driver 24 which causes the rotor 23 of the motor 22 to step in one direction to axially extend the tapered end of the valve stem 29 into the orifice 30 of the valve 17. Each step of the rotor 23 is tallied by the counting circuit 26 until the predetermined number of steps set by the data switches 27 has been attained.

Referring back to FIGS. 2 and 3, the (A>B) output of the comparator 51 is connected to an input 58a of a negated OR gate 58, the output of which is connected to the reset inputs of the flip flops 34 and 37. The complementary output of the multivibrator 56 is connected to the other input 58b of the negated OR gate 58. The complementary carry-out terminal of the counter 43 is connected through an inverter 59 to the reset inputs of the flip flops 54 and 57. Since the multivibrator 56 has not yet been triggered, its complementary output applies a high signal to the input 58b the negated OR gate 58. Furthermore, when the counters 42 and 43 reach a value B which is equal to or greater than the predetermined, preset number A the (A>B) output of the comparator 51 applies a low signal to the input 58a of the negated OR gate 58 which causes the output thereof to go high to reset the flip flops 34 and 37. As a result, the complementary output of the flip flop 37 applies a high signal to the input 40a of the negated OR gate 40 which inhibits the clock pulses (see FIG. 3, State 2) so that counting and stepping are discontinued. At this point, the valve stem 29 (FIG. 1) should be fully extended to achieve the desired cushioning exhaust rate as determined by the final size of the aperture of the valve 17.

Once the valve stem 29 is fully extended, it must be retracted to its original position. The computer 28 is programmed to apply the second control signal as a low signal to the OUT terminal of the counting circuit 26 which causes the control 25 to enter the RTR-T mode. When this occurs, the flip flop 54 (FIG. 2) becomes set because the positive-going edge of a pulse is applied to the toggle input while a high signal is applied to the data input thereof. As a result, the output of the flip flop 54 goes high and is applied to the input of the multivibrator 56 and the data terminal of the flip flop 57. The flip flop 57 becomes set when the positive-going edge of a pulse from the clock 38 is applied to the toggle input thereof. This synchronizes the output of the flip flop 57 with the positive-going edge of the clock 38. Thus, the complementary output of the flip flop 57 goes low while that of the flip flop 37 remains high so that the output of the negated OR gate 40 again goes high (see FIG. 3, State 3) to provide a high signal to the input 39b of the AND gate 39 to enable the clock pulses to be applied to both counters 42 and 43 and the toggle input T of the driver 24 (not shown). In this case, however, the output of the flip flop 37 and the complementary output of the flip flop 57 apply two low signals to the inputs 46a and 46b of the NAND gate 46. Consequently, the NAND gate 46 applies a high signal to the input 47b of the negated OR gate 47, the output of which applies a low signal to the direction input DIR of the driver 24 (not shown). Each pulse from the clock 38 is simultaneously being accounted for by the counters 42 and 43 which are now being decremented because the inverter 48, connected to the output of the NAND gate 46, applies a low signal to the up/down controls of the counters 42 and 43. Therefore, when the controller 25 (FIG. 1) is in the RTR-T mode, the counting circuit 26 applies pulses to the toggle input T and a low signal to the direction input DIR of the driver 24 which causes the rotor 23 of the motor 22 to step in the other direction to axially retract the tapered end of the valve stem 29 out from the orifice 30 of the valve 17. Each step of the rotor 23 is tallied by the counting circuit 26 until the count accumulated in the counters 42 and 43 during the EXT-T mode is decremented down to zero. When the counters 42 and 43 (FIGS. 2 and 3) reach zero, the complementary carry/out output of the counter 43 goes low and resets the flip flops 54 and 57 through the inverter 59. As a result, the output of the negated OR gate 40 goes low and applies the low signal to the input 39a of the AND gate 39 which finally inhibits the clock pulses so that both counting and stepping are discontinued. At this point, the valve stem 29 (FIG. 1) should be fully retracted to the initial aperture size.

As already mentioned, the speed of the piston 13 is a function of the exhaust rate which is controlled by the aperture size of the valve 17. The magnitude of the speed and cushion are inversely related to each other with respect to the aperture size of the valve 17; the larger the initial aperture setting, the greater the speed and the smaller the final aperture size stepped to, the greater the cushion. Since faster production speeds necessitate a cushion of greater magnitude to prevent the glassware from being damaged, a larger number of pulses must be applied to the toggle input T of the driver 24 to sufficiently restrict the aperture size of the valve 17 to achieve the desired cushioning. Furthermore, the duration of the cushioning cycle is a function of both the frequency and number of applied pulses. Decreasing the frequency or increasing the number of pulses increases the length of the cushioning cycle. The cushioning cycle is adjusted to maximize the period during which the mechanisms of an IS machine is operating at a production speed without damaging the glassware being handled.

Another operational feature of the counting circuit 26 is that the valve stem 29 is always returned to its original setting, even if the computer 28 were to apply the second control signal to the OUT terminal of the counting circuit 26 before the valve stem 29 was fully extended. More particularly, the counters 42 and 43 (FIG. 2) will decrement to zero from a number A', which is less than the predetermined preset number A, when interrupted by the premature application of the second control signal to the OUT terminal of the counting circuit 26. In such a case, the output of the flip flop 54 applies a high signal to the multivibrator 56, as described above, which causes the complementary output thereof to go low. The low signal and the normally high signal from the (A>B) output of the comparator 51 cause the output from the negated OR gate 58 to go high and reset the flip flops 34 and 37. This inhibits the clock pulses until the signal at the direction input DIR goes low to retract the valve stem 29 (not shown) as described above. The counters 42 and 43 then decrement back to zero from the intermediate number A'. This is a significant advantage since the operation of the counting circuit 26 is not frustrated by computer programming irregularities which may cause the second control signal to occur before the conclusion of the EXT-T mode.

An additional feature of the counting circuit 26 is the inclusion of momentary contact, manual override switches 60 and 61. The manual switch 60 is connected between the clock 38 and junction between the input 44b of the AND gate 44 and the resistor 45. The manual direction switch 61 is connected between ground and the junction between the input 47a of the negated OR gate 47 and the resistor 49. The switch 60, when depressed by an operator, applies the clock pulses through the AND gate 44 to the toggle input T of the driver 24 which causes the rotor 23 to step in the direction as determined by the direction switch 61. The direction switch causes a high signal to be applied to the direction input DIR of the driver 24 when normally open as shown, and a low signal when closed. Thus, the rotor 23 extends the valve stem 29 into the orifice 30 of the valve 17 when the direction switch 61 is open and retracts the valve stem 29 out from the orifice 30 when the direction switch 61 is closed as described above. This feature of the counting circuit 26 permits the operator to adjust the initial aperture size of the valve 17 so that the desired production speed can be achieved before entering the EXT-T mode.

It will be apparent that various changes may be made in the details of construction from those shown in the attached drawings and discussed in conjunction therewith without departing from the spirit and scope of this invention as defined in the appended claims. For example, the function accomplished with the screw shaft 21 and the internally threaded rotor 23 of the motor 22 could also be accomplished with a rack and pinion assembly. Also, the first and second control signals can be provided by the operator of the IS machine or any other control operating independently of the IS machine, as well as by the computer 28 as described above. Furthermore, the computer 28 can be used to control the stepping frequency of the pulse train being applied by the clock 38 to the toggle input T of the driver 22. In this way the piston 12 can be slowed at different rates according to a predetermined speed-profile stored in the computer 28. Finally, the computer 28 can be used in place of the data switches 27 to generate the predetermined number "A" which can be set by the computer 28 in response to varying production speeds and air pressures associated with the operation of the IS machine. It is, therefore, to be understood that this invention is not to be limited to the specific details shown and described.

What is claimed is:

1. In apparatus for controlling the aperture size of a valve in a fluid exhaust line from a reciprocable fluid motor in an individual section of a glass forming machine wherein a stepper motor is connected to the valve, a driver is electronically connected to said motor for stepping said motor both clockwise and counterclockwise, said driver having a toggle input responsive to a series of pulses and a direction input responsive to a signal, and a control means having outputs electrically connected to said driver for applying a predetermined number of pulses to the toggle input of said driver and a first signal to the direction input thereof, said control means having a first input responsive to a first control signal which causes said control means to enter an extend toggling mode in which said control means applies the predetermined number of pulses to the toggle input of said driver and applies a signal to the direction input of said driver whereupon said motor steps in one direction to decrease the aperture of the valve from a preset size to a restricted size, and a second input responsive after the extend toggling mode to a second control signal which causes said control means to enter a retract toggling mode in which said control means applies the predetermined number of pulses to the toggle input of said driver and applies a second signal to the direction input of said driver whereupon said motor steps in the other direction to increase the aperture of the valve back to the preset size, the improvement in said control means comprising a first manual override switch for applying clock pulses directly to the toggle input of said driver and a second manual override switch which when open applies a high, valve opening signal to the direction input to said driver and when closed applies a low, valve closing signal to the direction input to said driver for adjusting the initial aperture size of said valve.

* * * * *